US008651372B2

(12) United States Patent
Shih et al.

(10) Patent No.: US 8,651,372 B2
(45) Date of Patent: Feb. 18, 2014

(54) SELF-SERVICE TERMINAL

(75) Inventors: Chih-Kun Shih, Santa Clara, CA (US); Si-Long Li, Shenzhen (CN); Yang-Jie Luo, Shenzhen (CN); Wan-Cheng Luo, Shenzhen (CN); Xiang-Xiong Xiao, Shenzhen (CN); Jie Peng, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 607 days.

(21) Appl. No.: 12/954,755

(22) Filed: Nov. 26, 2010

(65) Prior Publication Data

US 2012/0002353 A1 Jan. 5, 2012

(30) Foreign Application Priority Data

Jul. 2, 2010 (CN) .......................... 2010 1 0216395

(51) Int. Cl.
*G07F 19/00* (2006.01)
*G06F 7/08* (2006.01)
*G06Q 40/00* (2012.01)

(52) U.S. Cl.
USPC .............................. 235/379; 235/381; 705/43

(58) Field of Classification Search
USPC ....................... 235/375, 379–381; 705/35–45
See application file for complete search history.

(56) References Cited

U.S. PATENT DOCUMENTS

| | | | | |
|---|---|---|---|---|
| 5,483,047 | A * | 1/1996 | Ramachandran et al. | 235/379 |
| 6,082,616 | A * | 7/2000 | Lewis et al. | 235/379 |
| 7,726,558 | B1 * | 6/2010 | Lute et al. | 235/379 |
| 8,127,981 | B1 * | 3/2012 | Kraft et al. | 235/379 |
| 8,181,857 | B1 * | 5/2012 | Lute et al. | 235/379 |
| 8,342,398 | B2 * | 1/2013 | Douglass et al. | 235/379 |
| 2004/0222286 | A1 * | 11/2004 | Douglass et al. | 235/381 |
| 2005/0029341 | A1 * | 2/2005 | Magee et al. | 235/379 |

* cited by examiner

*Primary Examiner* — Thien M Le
*Assistant Examiner* — April Taylor
(74) *Attorney, Agent, or Firm* — Altis Law Group, Inc.

(57) ABSTRACT

A self-service terminal includes a first cabinet, a cover rotatably secured on the first cabinet, and an adjustment device received in the first cabinet. A card slot for inputting/outputting a cash card is defined in the cover, and a positioning member is attached to the user interface cover. The adjustment device includes a positioning tray and a mounting member slidably secured to the positioning tray. A reader is attached to the positioning tray and includes an interface. The mounting member includes a slanted side plate abutting the positioning tray; wherein the positioning member is engaged with the positioning tray, for aligning with the interface of the reader and the card slot of the cover.

20 Claims, 6 Drawing Sheets

SELF-SERVICE TERMINAL

BACKGROUND

1. Technical Field

The present disclosure relates to electronic devices, more particularly a self-service terminal.

2. Description of Related Art

Self-service terminals are developed for bank customers to process many daily financial transactions, such as depositing currency, withdrawing currency, and inquiring account information. After new self-service terminals come into use, the software often needs to be updated to add new functions or improve security. Therefore, maintenance work is important for the self-service terminals, no matter if they are new or old. Usually, an opening in the panel of the self-service terminal is aligned with an interface of a reader in the self-service terminal by eye, and that is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
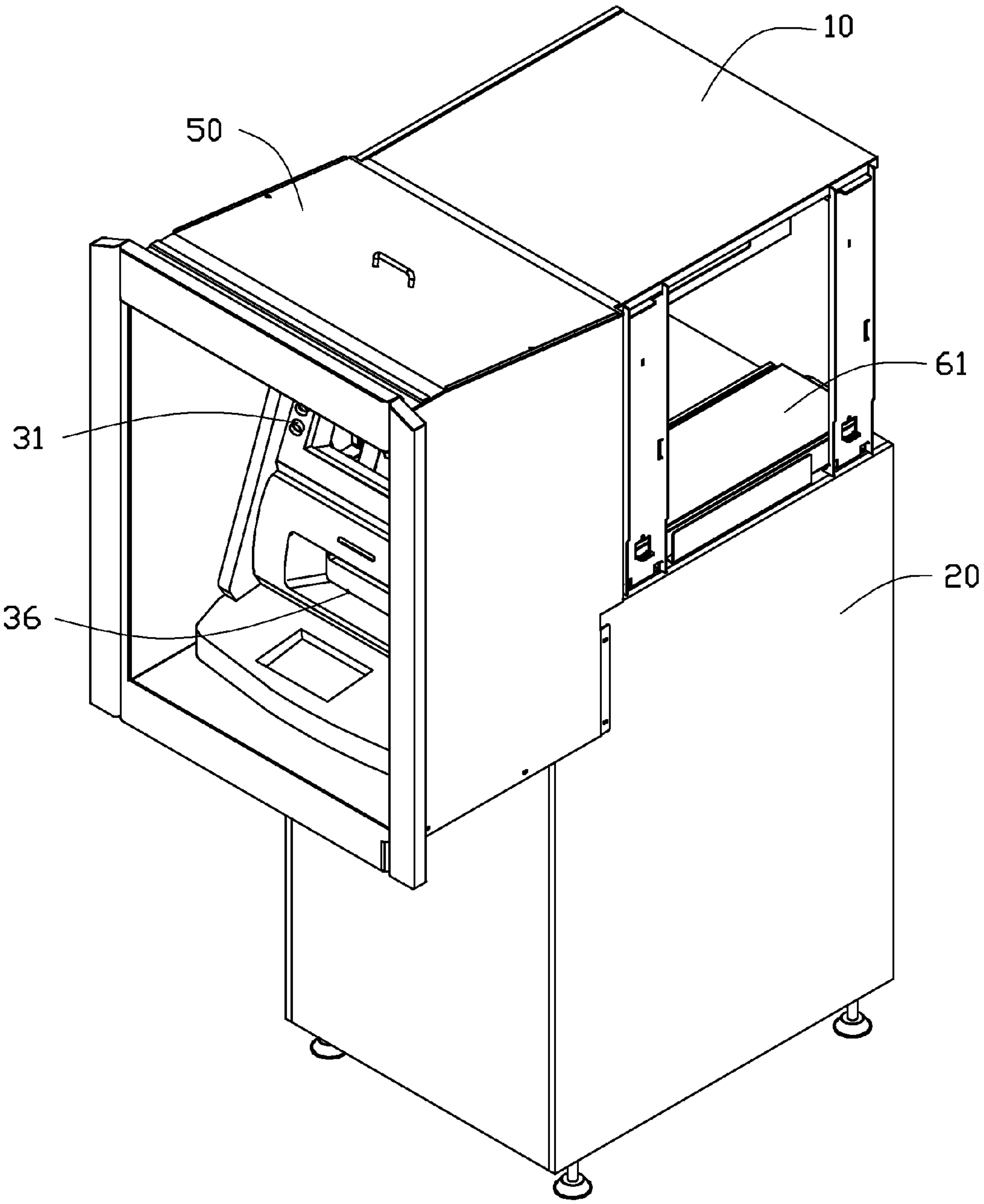
FIG. 1 is an isometric view of a self-service terminal in accordance with an embodiment.
Figure 2:
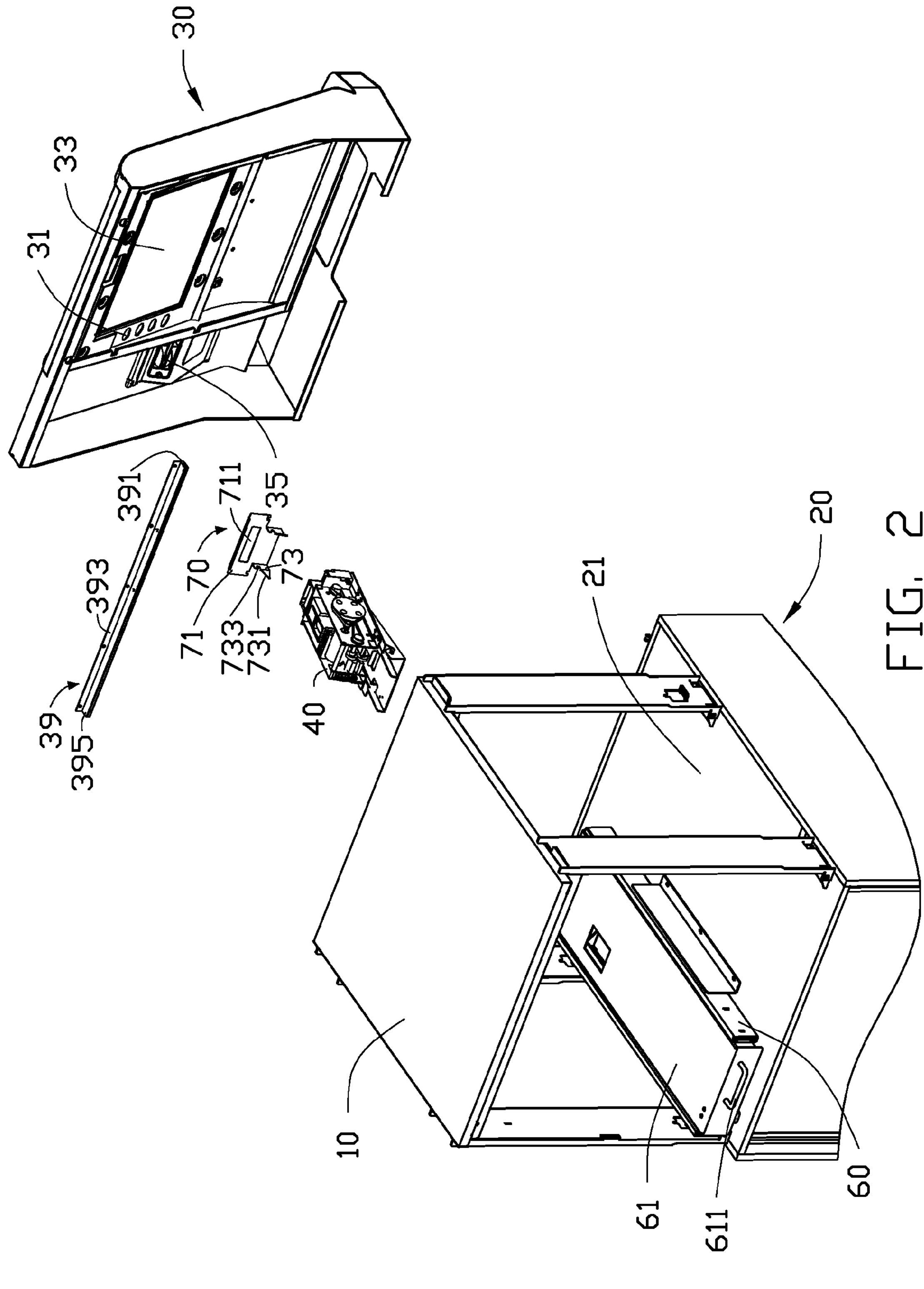
FIG. 2 is a partially exploded, isometric view of a self-service terminal in accordance with an embodiment.

Referring to FIGS. 1 and 2, a self-service terminal in accordance with an embodiment includes a first cabinet 10, and a second cabinet 20 secured to a bottom of the first cabinet 10. A user interface cover 30 is rotatably secured to the front of the first cabinet 10, an adjusting device 40 is attached to a top of the second cabinet 20, and a carrier 50 covers the user interface cover 30. In one embodiment, the self-service terminal may be an automatic teller machine.

The second cabinet 20 includes a top plate 21. A tray 61 is secured to the top plate 21 by a rail 60. Therefore, the tray 61 can be slid relative to the top plate 21. A handle 611 is disposed on an end of the tray 61, and two securing holes (not shown) are defined in a top of the tray 61.

The user interface cover 30 includes a number of buttons 31, a screen 33, a card slot 35, and a dispensing mechanism 36. The buttons 31 are used to input instructions. The screen 33 shows information. The card slot 35 is used to input or output a debt card. The dispensing mechanism 36 is used to deliver the cash out of the self-service terminal.

A hinge 39 is secured to the user interface cover 30, and includes an axis 391 a first connecting portions 393 and a second connecting portion 395 connected to the axis 391. The first connecting portion 393 is secured to the user interface cover 30, and the second connecting portion 395 is secured to the first cabinet 10. Therefore, the user interface cover 30 is rotatably secured to the first cabinet 10.

A positioning member 70 is configured to be located inside of the user interface cover 30. The positioning member 70 includes a securing panel 71, and two positioning pieces 73 connected to two opposite edges of the securing panel 71. A through hole 711 is defined in the securing panel 71, corresponding to the card slot 35. A slanted edge 731 is formed on each positioning piece 73, and a clipping slot 733 is defined in the positioning piece 73.

Figure 3:
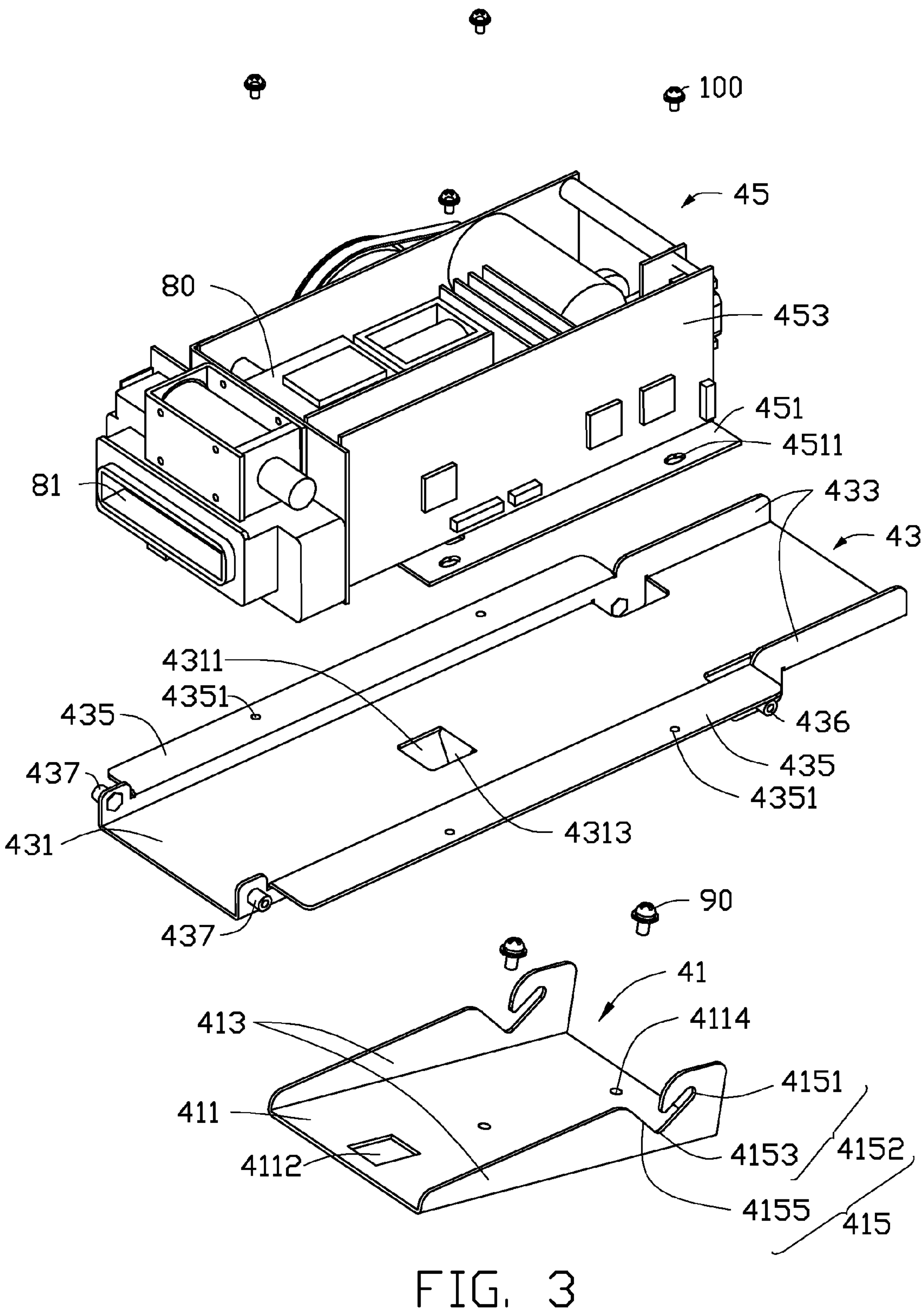
FIG. 3 is an exploded, isometric view of an adjusting device of the self-service terminal of FIG. 2.

Referring to FIG. 3, the adjusting device 40 includes a mounting member 41 attached to the tray 61, a positioning tray 43 positioned on the mounting member 41, and a bracket 45 secured to the positioning tray 43.

The mounting member 41 includes a mounting plate 411, and two slanted side plates 413 connected to two opposite edges of the mounting plate 411. A limiting slot 4112 and two mounting holes 4114 are defined in the mounting plate 411. A sliding slot 415 is defined in each slanted side plate 413, and includes a first slanted portion 4152 and a second slanted portion 4155 connected to the first slanted portion 4152. The first slanted portion 4152 includes a first end 4151, and a second end 4153 connected with the second slanted portion 4155.

The positioning tray 43 includes a positioning panel 431, two first flanges 433 connected to two long opposite edges of the positioning panel 431. An opening 4311 is defined in the positioning panel 431, and an extension piece 4313 is disposed on an edge of the opening 4311, corresponding to the limiting slot 4112. A second flange 435 is connected to each first flange 433, and two fastening holes 4351 are defined in the second flange 435. A first post 436 and a second post 437 are disposed on each first flange 433. The first post 436 is positioned in the sliding slot 415. The second post 437 slides along the slanted edge 731 of the positioning member 70. The positioning tray 43 moves relative to the two slanted side plates 413 of the mounting member 41 and engages in the clipping slot 731. The extension piece 4313 slides in the limiting slot 4112, and can be blocked in a front end and a back end of the limiting slot 4112 opposite to the front end. When the extension piece 4313 is positioned in the front end, the first post 436 is positioned in the second end 4153 of the sliding slot 415. When the extension piece 4313 is positioned in the back end, the first post 436 is positioned in the first end 4151 of the sliding slot 415. In one embodiment, the first post 436 abuts the second flange 435, and the second post 437 is located one side of the second flange 435.

The bracket 45 accommodates a reader 80, and includes a bottom panel 451, and two side panels 453 connected to two long opposite edges of the bottom panel 451. Two fixing holes 4511 are respectively defined in two opposite sides of the bottom panel 451, corresponding to the fastening holes 4351 of the second flange 435. An interface 81 is defined in the front of the reader 80 and for the cash card to be inserted into the reader 80.

Figure 4:
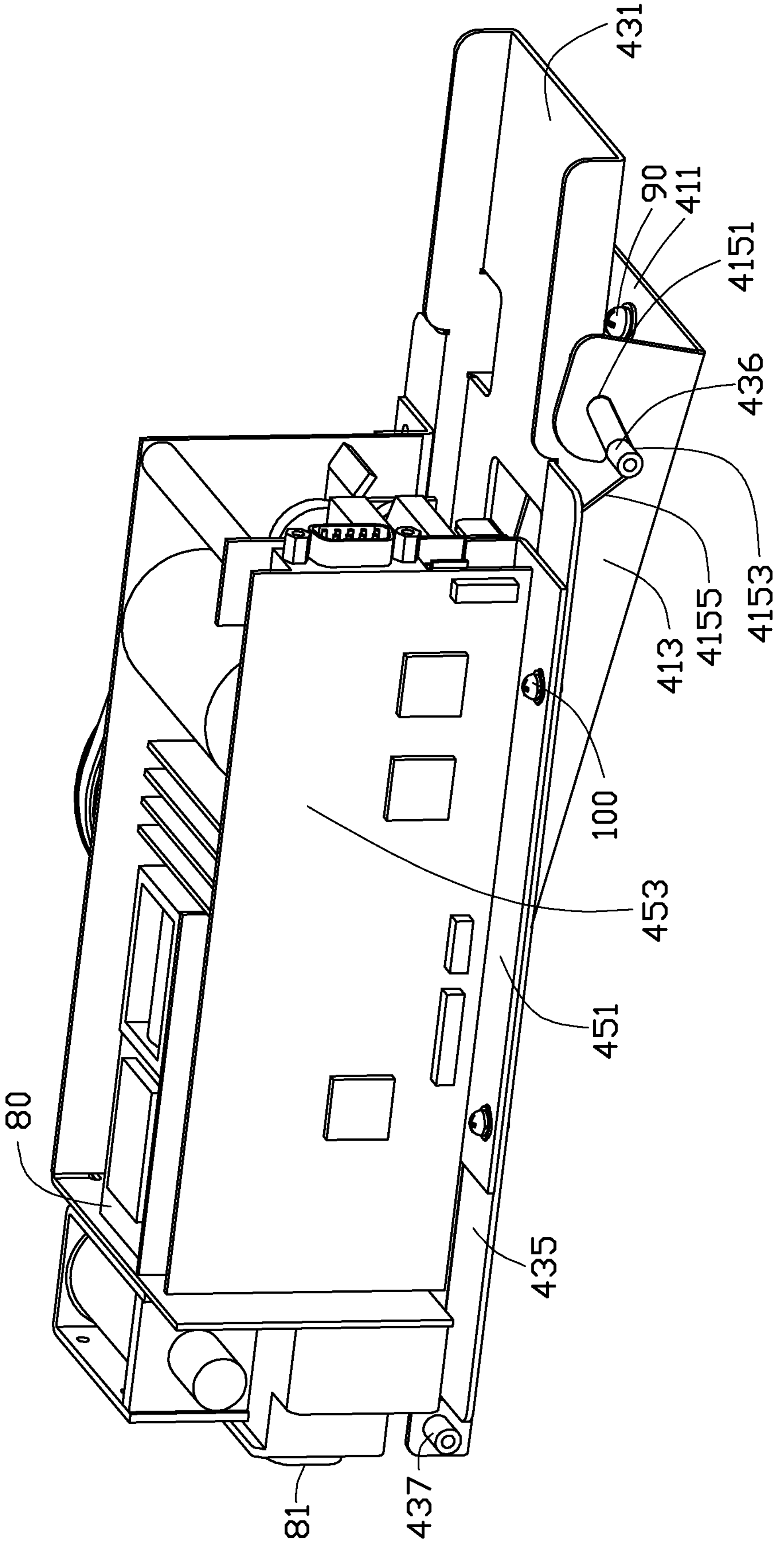
FIG. 4 is an assembled view of FIG. 3, showing in a different aspect.
Figure 5:
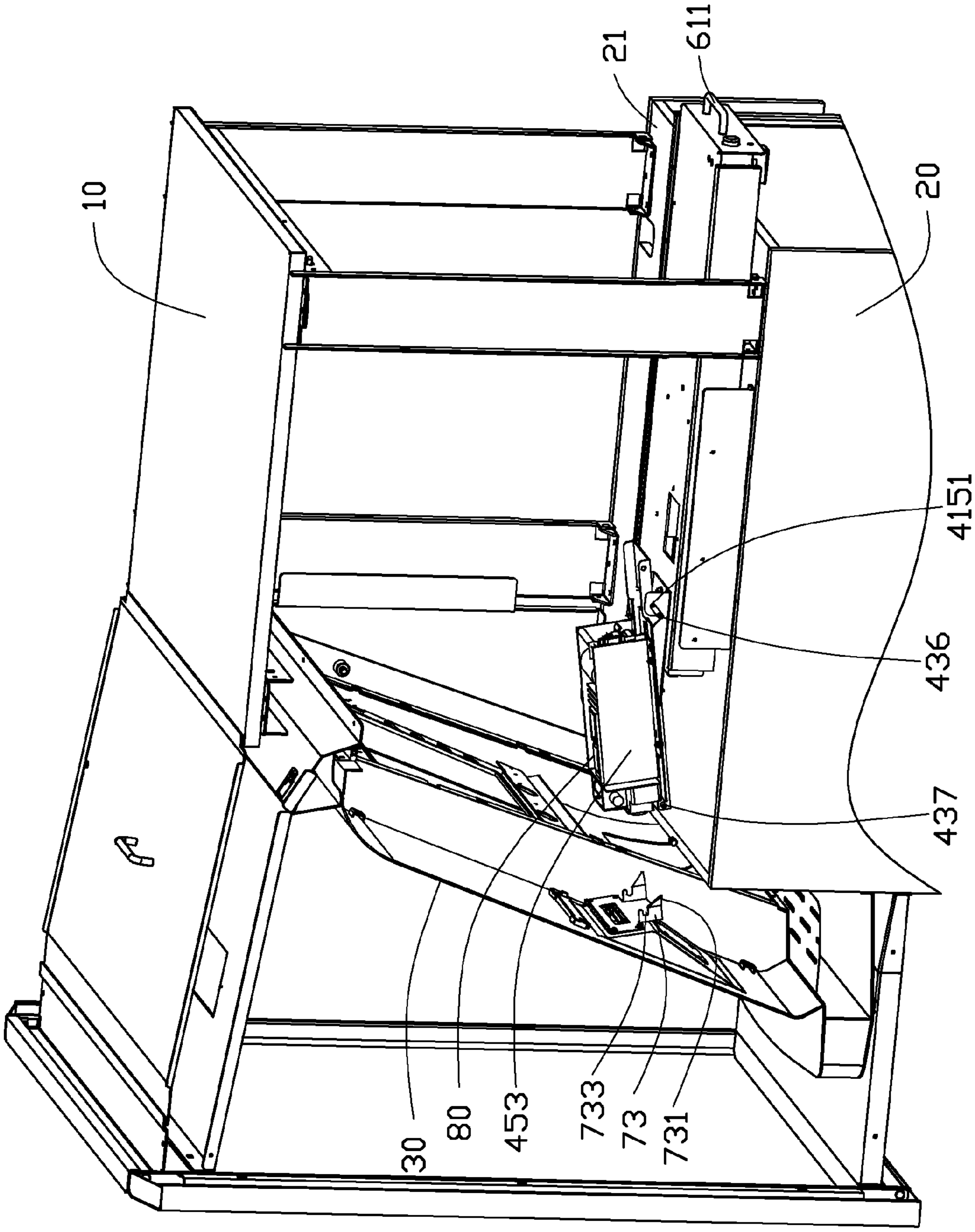
FIG. 5 is an assembled view of FIG. 2, showing in a different aspect and a positioning tray in a first position.

Referring to FIGS. 4 and 5, in assembly, the connecting portion 393 of the hinge 39 is secured to the user interface cover 30 by fasteners. The connecting portion 395 of the hinge 39 is secured to the first cabinet 10, so as to rotatably mount the user interface cover 30 to the first cabinet 10. The positioning member 70 is secured on the user interface cover 30, and the through hole 711 communicates with the card slot 35.

The mounting member 41 is placed on the tray 61, and the low end of the slanted side plates 413 faces the user interface cover 30. The mounting holes 4114 of the mounting plate 411 are aligned with the securing holes of the tray 61. Two first fixing components 90 are screwed into the mounting holes 4114 and the securing holes of the tray 61, to secure the mounting member 41 to the tray 61. The bracket 45 is placed on the positioning tray 43. The fixing holes 4511 of the bottom panel 451 are aligned with the fastening holes 4351 of the second flange 435. Four second fixing components 100 are screwed into the fixing holes 4511 and the fastening holes 4351, to secure the bracket 45 to the positioning tray 43.

The positioning tray 43 abuts the two slanted side plate 413, and the two first posts 436 are respectively slid into the slots 415 by the second slanted portion 4155. The two second flanges 435 respectively abut on the two slanted side plates 413. The positioning tray 43 can be slid between a first position and a second position. In the first position, the extension piece 4313 is located in the front end of the limiting slot 4112, and the first post 436 is positioned in the second end 4153. In the second position, the extension piece 4313 is located in the back end of the limiting slot 4112, and the first post 436 is positioned in the first end 4151.

Figure 6:
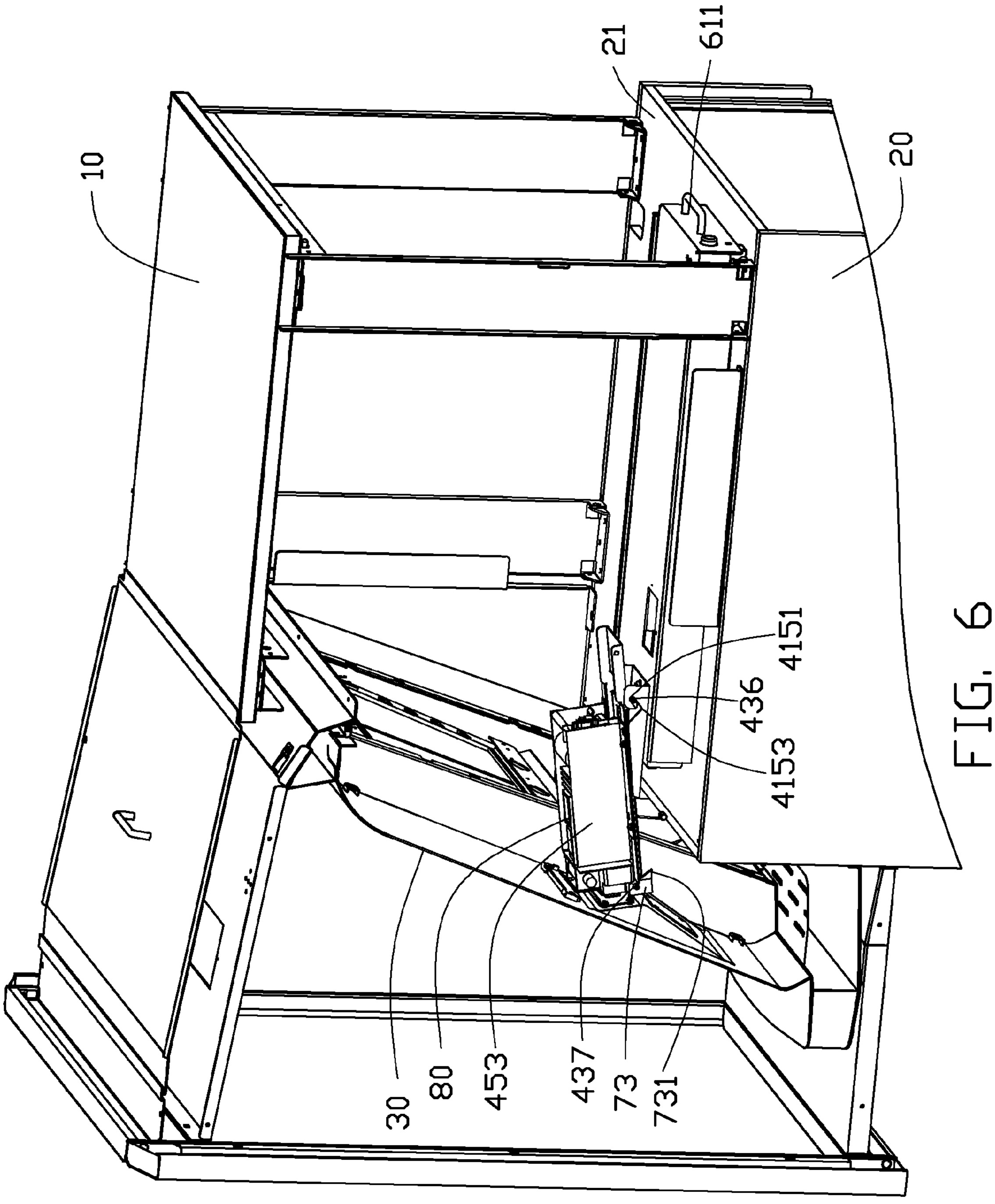
FIG. 6 is similar to FIG. 5, but shows the positioning tray in a second position.

Referring to FIGS. 5 and 6, in use, the user interface cover 30 is not covered on the first cabinet 10, the positioning tray 43 is located in the first position, and the interface 81 of the reader 80 is adjacent to the user interface cover 30. Then, the user interface cover 30 is rotated towards the positioning tray 43, until the bottom of the slanted edge 731 abuts the second post 437. The user interface cover 30 is further pushed, to move the second post 437 along the slanted edge 731 and slide the positioning tray 43 away from the user interface cover 30, until the second post 437 is engaged in the clipping slot 733. Then, the positioning tray 43 is located in the second position, for the first post 436 is positioned in the first end 4151. Therefore, the card slot 35 of the user interface cover 30 can be aligned with the interface 81 of the reader 80

In maintaining or checking the reader 80, a cover (not shown) of the first cabinet 10 is opened, and the handle 611 is pulled to slide the tray 61 away from the user interface cover 30. So the adjustment device 40 is moved away from the user interface cover 30, until the second post 437 is disengaged from the clipping slot 733 and slid along the slanted edge 731. Then, the positioning tray 43 is moved along the slanted side plate 413, relative to the mounting member 41, until the positioning tray 43 is located in the first position. The handle 611 is further pulled, and the adjusting device 40 is out of the first cabinet 10. The positioning tray 43 is removed from the mounting member 41, with the first post 436 sliding out of the second slanted portion 4155 from the second end 4153. Therefore, the reader 80 in the bracket 45 can be checked.

In another embodiment, in use, the user interface cover 30 is secured to the first cabinet 10, and the positioning tray 43 is located in the first position far away from the user interface cover 30. The handle 611 is pushed, and the tray 61 with the positioning tray 43 is slid towards the user interface cover 30. Until the interface 81 of the reader 80 in the bracket 45 abuts against the bottom of the positioning member 70. The handle 611 is further pushed, and the second post 437 moves along the slanted edge 731, until the second post 437 is engaged in the clipping slot 733. Then, the positioning tray 43 mounting the bracket 45 is located in the second position for the first post 436 is positioned in the first end 4151. Therefore, the interface 81 of the reader 80 can be pushed to align with the card slot 35 of the user interface cover 30, from the bottom of the positioning member 70.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A self-service terminal comprising:

a first cabinet;

a cover rotatably secured on the first cabinet, a card slot for inputting/outputting a cash card defined in the cover, and a positioning member attached to the cover; the positioning member comprises a slanted edge and a clipping slot adjacent to the slanted edge; and an adjusting device, received in the first cabinet, comprising a positioning tray and a mounting member slidably secured to the positioning tray; a reader, attached to the positioning tray, comprising an interface; and the mounting member comprising a slanted side plate abutting the positioning tray;

wherein the positioning tray is slidable along the slanted side plate, and the positioning tray extends through the slanted edge and is engaged in the clipping slot, for aligning with the interface of the reader and the card slot of the cover.

2. The self-service terminal of claim 1, wherein a low portion of the slanted side plate is adjacent to the cover.

3. The self-service terminal of claim 1, wherein the positioning tray comprises a positioning panel abutting the slanted side plate, and an extension piece that extends substantially perpendicular from the positioning panel; the mounting member comprises a mounting plate substantially perpendicular to the slanted side plate; a limiting slot is defined in the the mounting plate, and the extension piece is slidably received in the limiting slot.

4. The self-service terminal of claim 3, wherein a first post is disposed on the positioning tray, and a sliding slot, accommodating the first post, is defined in the slanted side plate.

5. The self-service terminal of claim 4, wherein the positioning tray further comprises a first flange substantially perpendicular connected to the positioning panel, and a second flange substantially perpendicularly connected to the first flange, the first flange is substantially parallel to the positioning panel; wherein the first post abuts to the second flange, and a bracket, securing the reader, is secured to the second flange.

6. The self-service terminal of claim 3, wherein the sliding slot comprises a first slanted portion, the first slanted portion comprises a first end, and the first post is located in the first end when the extension piece is positioned in a back end of the limiting slot.

7. The self-service terminal of claim 6, wherein the sliding slot comprises a second end opposite to the first end, and the first post is located in the second end when the extension piece is positioned in a front end of the limiting slot.

8. The self-service terminal of claim 7, wherein the sliding slot comprises a second slanted portion, the second slanted portion is connected to the second end of the first slanted portion, and an obtuse angle is defined between the first slanted portion and the second slanted portion.

9. The self-service terminal of claim 1, wherein a second post, engaged in the clipping slot, is disposed on the positioning tray.

10. The self-service terminal of claim 1, further comprising a second cabinet connected to the first cabinet, a rail is attached to the second cabinet and received in the first cabinet, and a tray is secured to the mounting member and the rail.

11. A self-service terminal comprising:

a first cabinet;

a second cabinet secured to the first cabinet;

a cover rotatably secured on the first cabinet, a card slot for inputting/outputting a cash card defined in the cover, a positioning member attached to the cover; and an adjusting device, secured on the second cabinet and received in the first cabinet, comprising a positioning tray and a mounting member slidably secured to the positioning tray; a reader, attached to the positioning tray, comprising an interface; the mounting member comprising a slanted side plate abutting to the positioning tray, a first post disposed on the positioning tray, and a sliding slot defined in the mounting member;

wherein the positioning tray is slidable along the slanted side plate relative to the mounting member between a first position and a second position relative to the mounting member; in the first position, the first post is positioned in a first end of the sliding slot, and the positioning tray is engaged with the positioning member, for the interface of the reader is aligned with the card slot of the cover; and in the second position, the first post is positioned in a second end of the sliding slot, and the positioning tray is disengaged from the positioning member, for the interface of the reader is away from the card slot of the cover.

12. The self-service terminal of claim 11, wherein a slanted edge is disposed on the positioning member, and the slanted edge abuts the positioning tray.

13. The self-service terminal of claim 12, wherein a clipping slot is defined in the positioning member and adjacent to the slanted edge, a second post is disposed on the positioning tray, and the second post is slidable along the slanted edge to engage in the clipping slot.

14. The self-service terminal of claim 11, wherein a low portion of the slanted side plate is adjacent to the cover.

15. The self-service terminal of claim 11, wherein the positioning tray comprises a positioning panel abutting the slanted side plate, and an extension piece that extends substantially perpendicular from the positioning panel; the mounting member comprises a mounting plate substantially perpendicular to the slanted side plate; a limiting slot is defined in the the mounting plate, and the extension piece is slidably received in the limiting slot.

16. The self-service terminal of claim 15, wherein the positioning tray further comprises a first flange substantially perpendicular connected to the positioning panel, and a second flange substantially perpendicular connected to the first flange, the first flange is substantially parallel to the positioning panel; wherein the first post abuts to the second flange.

17. The self-service terminal of claim 16, further comprising a bracket secured to the second flange; wherein the reader is secured to the bracket.

18. The self-service terminal of claim 11, wherein the sliding slot comprise a first slanted portion and a second slanted portion, the second slanted portion is connected to the second end of the first slanted portion, and an obtuse angle is defined between the first slanted portion and the second slanted portion.

19. The self-service terminal of claim 11, wherein a rail is attached to the second cabinet and received in the first cabinet, and a tray is secured to the mounting member and the rail.

20. The self-service terminal of claim 11, wherein the self-service terminal is an automatic teller machine.

* * * * *